Figure 1:
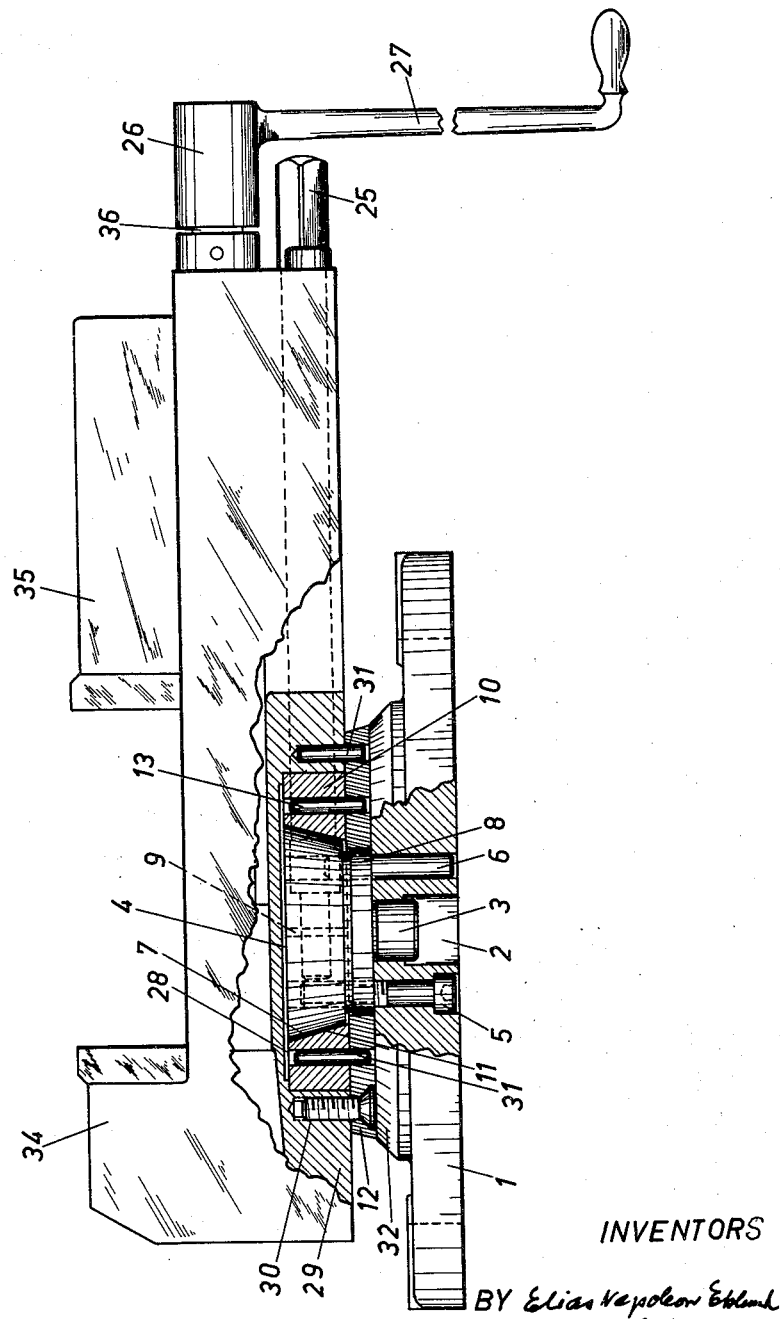

Sept. 18, 1962  E. N. EKLUND ET AL  3,054,610
MACHINE-TOOL VISES

Filed May 11, 1960  2 Sheets-Sheet 1

INVENTORS
BY Elias Napoleon Eklund
  Per Aldrin
By Peter W. Rogers
  atty

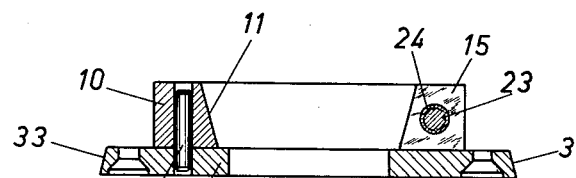
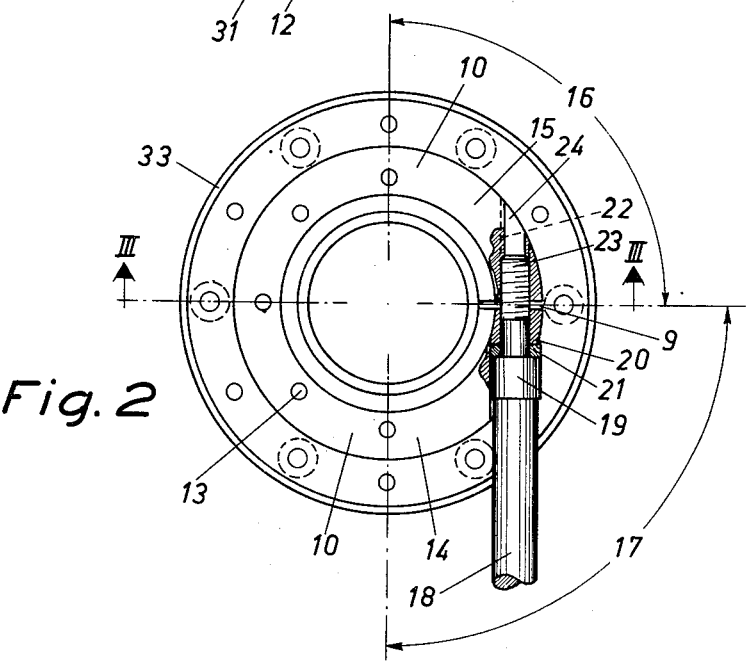
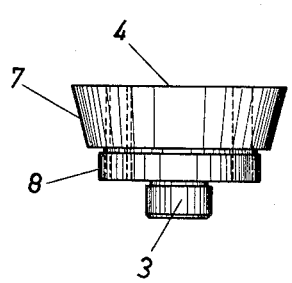

3,054,610
MACHINE-TOOL VISES
Elias Napoleon Eklund, Stockholm, and Per Aldrin, Johanneshov, Sweden, assignors to AB E. N. Eklunds Mekaniska Verkstad, Stockholm, Sweden, a corporation of Sweden
Filed May 11, 1960, Ser. No. 28,398
Claims priority, application Sweden May 16, 1959
4 Claims. (Cl. 269—78)

This invention relates to machine-tool vises turnable on a bottom plate and having bodies provided with two jaws one being fixed to the body and the other one being movable on the body toward and away from the fixed jaw by means of a screw spindle. The body is turnable relative to a base plate. Such a vise as concerns the invention is provided with a conical central part which is non-turnable relative to the bottom plate and the vise has further a slotted clamping ring cooperating with said central part and being turnable together with said body. The parts of said ring situated on either side of said slot are adapted to be pressed together around the central piece for the pressing of the body against the bottom plate. The clamping ring parts are pressed together by means of a crank or the like on a clamping screw turnable in said body. Such a construction is shown in Patent No. 2,835,156 of May 20, 1958, of one of the present applicants.

By means of such a vise it is possible to clamp the work piece between the jaws exactly in the adjusted position. Thus, the adjustment is not disturbed during the clamping of the work piece. However, it has turned out that the position of the work piece as well as the adjustment of the same may be somewhat changed when the body is exposed to small pushes and shocks. When a work piece is to be worked with high precision such a change in the adjustment cannot be tolerated.

This drawback is eliminated by means of the present invention. The main feature of the invention is that the clamping ring on the under side is non-turnably connected with a disk ring in such a way that essentially only those two parts of the clamping ring situated closest to the slot remain free and said disk ring is non-turnably connected with the body.

Other features of the invention will be apparent from the following description with reference to the accompanying drawings which show a machine-tool vise according to the invention. In the drawings:

FIG. 1 is a fragmental side elevation partly in section of the machine-tool vise according to the invention, FIG. 2 is a plan view partly in section of the clamping ring with the clamping screw, FIG. 3 shows a vertical section through the clamping ring on the line III—III in FIG. 2, and FIG. 4 is a side elevation of the conical central piece of the machine-tool vise.

According to the embodiment shown in the drawings, the machine-tool vise comprises a base plate 1 with a central bore 2 in which a cylindrical stud or peg 3 on a central part 4 is inserted from above. Said part 4 is connected with the bottom plate 1 by means of a number of bolts 5 and pins 6. The central part 4 has an upper conical portion with a mantle surface 7 decreasing in diameter in the direction towards the bottom plate 1. Above the peg 3 the central part is provided with a cylindrical shoulder 8. The mantle surface 7 is surrounded by a clamping ring 10 having a transverse slot 9. The inner mantle surface 11 of the clamping ring 10 rests on the mantle surface 7 of the central piece 4. A disk ring 12 is carried on the shoulder 8 and is turnable around the same with a good fitting. The disk ring 12 is by means of pins 13 connected with the clamping ring 10 in such a way that said disk ring 12 at the portion of the ring 10 situated opposite the slot 9 is rigidly connected with said ring 10. Only the two portions of ring 10 which are situated in the quadrants 16, 17 on either side of the slot 9 (see FIG. 2) have no direct conection with the disk ring 12. By means of a screw 18 the portions at 16 and 17 can be clamped around the mantle surface 7. The clamping screw 18 is at its inner end shaped with a shoulder 19 and between the shoulder 19 and a shoulder 20 on the clamping ring portion 14 there is inserted a tubular spacer 21. The clamping screw 18 passes freely turnably through the clamping ring portion 14 and is provided with outer threads 22 which fit inner threads 23 in a bore 24 of the clamping ring portion 15. The outer end of the clamping screw 18 is provided with a square head 25 for cooperation with the hub portion 26 on a crank 27, said hub portion 26 having a notch corresponding to the square head 25. The clamping screw 18 can be turned by means of the crank 27. The clamping ring 10 is inserted from below into a bore 28 in the body 29 of the machine-tool vise. The disk ring 12 is attached to the body 29 by means of screws 30 and pins 31.

The bottom plate 1 is provided with the graduated scale 32 to be read relative to an index line (not shown) on the mantle surface 33 of the disk ring 12.

The body 29 has a stationary jaw 34 and a jaw 35 movable relatively to said stationary jaw 34. The jaw 35 can be moved by means of a screw spindle 36 with a crank 27.

Upon clamping of a work piece between the jaws 34, 35, the body 29 is turned around the central piece 4 to the desired position. Thereupon the clamping screw 18 is tightened whereby the clamping ring portions 14, 15 are clamped around the mantle surface 7. This clamping results in a clamping of the body 29 with the disk ring 12 against the bottom plate 1. The clamping of the body 29 is very effective and the adjustment of the work piece is not disturbed even when the body is exposed to pushes and shocks, e.g. in the vicinity of the head 25 of the clamping screw 18.

The present invention has been described in detail above for purposes of illustration only and is not intended to be limited by this description or otherwise except as defined in the appended claims.

What we claim is:

1. A machine-tool vise comprising a body provided with a fixed jaw; a movable jaw and a screw spindle on the body for moving the movable jaw toward and away from the fixed jaw; a bottom plate for mounting the body and provided with an axially vertical downwardly tapering conical central part non-rotatable relative to said bottom plate; a conical clamping ring under the body and having peripheral end portions leaving a slot therebetween and cooperating with and engaging around said central part and turnable with said body for urging the body toward the plate; a clamping screw and crank therefor and turnable on said body and in the end portion for drawing the end portions of the clamping ring together, a horizontal disk ring between the clamping ring and plate and connected to the clamping ring at zones remote from the slot so that only the ring portions situated close to said slot remain free, said disk ring being non-turnably connected with said body.

2. A machine-tool vise comprising a body provided with a fixed jaw; a movable jaw on the body and a screw spindle on the body for moving the movable jaw toward and away from the fixed jaw; a bottom plate for mounting the body; an axially vertical downwardly tapering conical central part having a disk-like shoulder thereunder on and non-rotatable relative to said bottom plate; a conical clamping ring under the body and having peripheral end portions leaving a slot therebetween and cooperating with and engaging around said central part and turnable with said body for urging the body toward the plate; a clamping screw and crank therefor and turnable on said body for drawing the end portions of the clamping ring together, a horizontal disk ring between the clamping ring and plate and connected to the clamping ring at zones remote from the slot so that only the ring portions situated close to said slot remain free, said disk ring being non-turnably connected with said body and surrounding the shoulder with a good fit.

3. A machine-tool vise comprising a body provided with a fixed jaw; a movable jaw on the body and a screw spindle on the body for moving the movable jaw toward and away from the fixed jaw; a bottom plate having a hole therein; an upstanding axially vertical downwardly tapering conical central part having a disk-like shoulder thereunder and a lower stud end in the hole, said part being fast on the plate non-rotatable relative to said bottom plate; a conical clamping ring under the body having peripheral end portions leaving a slot therebetween and cooperating with and engaging around said central part and turnable with said body for urging the body toward the plate; a clamping screw and crank therefor and turnable in said body for drawing the end portions of the clamping ring together, a horizontal disk ring between the clamping ring and plate and connected to the clamping ring at zones remote from the slot so that only the ring portions situated for about 90° from each side of said slot remain free, said disk ring being non-turnably connected with said body and surrounding the shoulder with a good fit.

4. A vise as claimed in claim 3 and index markings on the plate and central part.

References Cited in the file of this patent

UNITED STATES PATENTS

| 740,271 | Haggstrom | Sept. 29, 1903 |
| 2,363,230 | Condon et al. | Nov. 21, 1944 |
| 2,835,156 | Eklund | May 20, 1958 |

FOREIGN PATENTS

| 21,816 | Great Britain | of 1914 |